(12) United States Patent
Fujita

(10) Patent No.: US 12,337,896 B2
(45) Date of Patent: Jun. 24, 2025

(54) TRACK DEVIATION PREVENTION DEVICE

(71) Applicant: TOYOTA JIDOSHA KABUSHIKI KAISHA, Toyota (JP)

(72) Inventor: Masahiro Fujita, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 263 days.

(21) Appl. No.: 17/952,733

(22) Filed: Sep. 26, 2022

(65) Prior Publication Data
US 2023/0135893 A1    May 4, 2023

(30) Foreign Application Priority Data

Oct. 28, 2021   (JP) .................................. 2021-176311

(51) Int. Cl.
*B62D 15/02*   (2006.01)
(52) U.S. Cl.
CPC ....... *B62D 15/0265* (2013.01); *B62D 15/025* (2013.01); *B62D 15/021* (2013.01)
(58) Field of Classification Search
CPC . B62D 15/021; B62D 15/025; B62D 15/0265
See application file for complete search history.

(56) References Cited

U.S. PATENT DOCUMENTS

| 10,614,717 B2 * | 4/2020 | Caldwell ............. B60W 30/095 |
| 2009/0088966 A1 | 4/2009 | Yokoyama et al. |
| 2011/0276227 A1 | 11/2011 | Sugawara et al. |
| 2018/0134290 A1 | 5/2018 | Kataoka et al. |
| 2020/0023899 A1 | 1/2020 | Takahashi et al. |

FOREIGN PATENT DOCUMENTS

| JP | 2005-324782 A | 11/2005 |
| JP | 2006-331304 A | 12/2006 |
| JP | 2009-078733 A | 4/2009 |
| JP | 2010023605 A | 2/2010 |
| JP | 2010-089701 A | 4/2010 |
| JP | 2011134071 A * | 7/2011 |
| JP | 2018-079835 A | 5/2018 |
| JP | 2020-011562 A | 1/2020 |
| JP | 2020-181246 A | 11/2020 |

* cited by examiner

Primary Examiner — Mark L. Greene
(74) Attorney, Agent, or Firm — Sughrue Mion, PLLC

(57) ABSTRACT

A driving assistance ECU acquires, as a lateral margin distance, a larger distance out of a distance of a space formed between an object and a left lane marking in a track width direction and a distance of a space formed between the object and a right side lane marking in the track width direction when the object is present in front of the host vehicle. The ECU determines whether the probability that a host vehicle deviates from a track when the host vehicle passes by a side of the object is high, based on the lateral margin distance, and moves a deviation regulation line on a side on which the host vehicle is expected to cross out of a left side deviation regulation line and a right side deviation regulation line to an outside of the track by a predetermined offset distance when the probability is high.

2 Claims, 8 Drawing Sheets

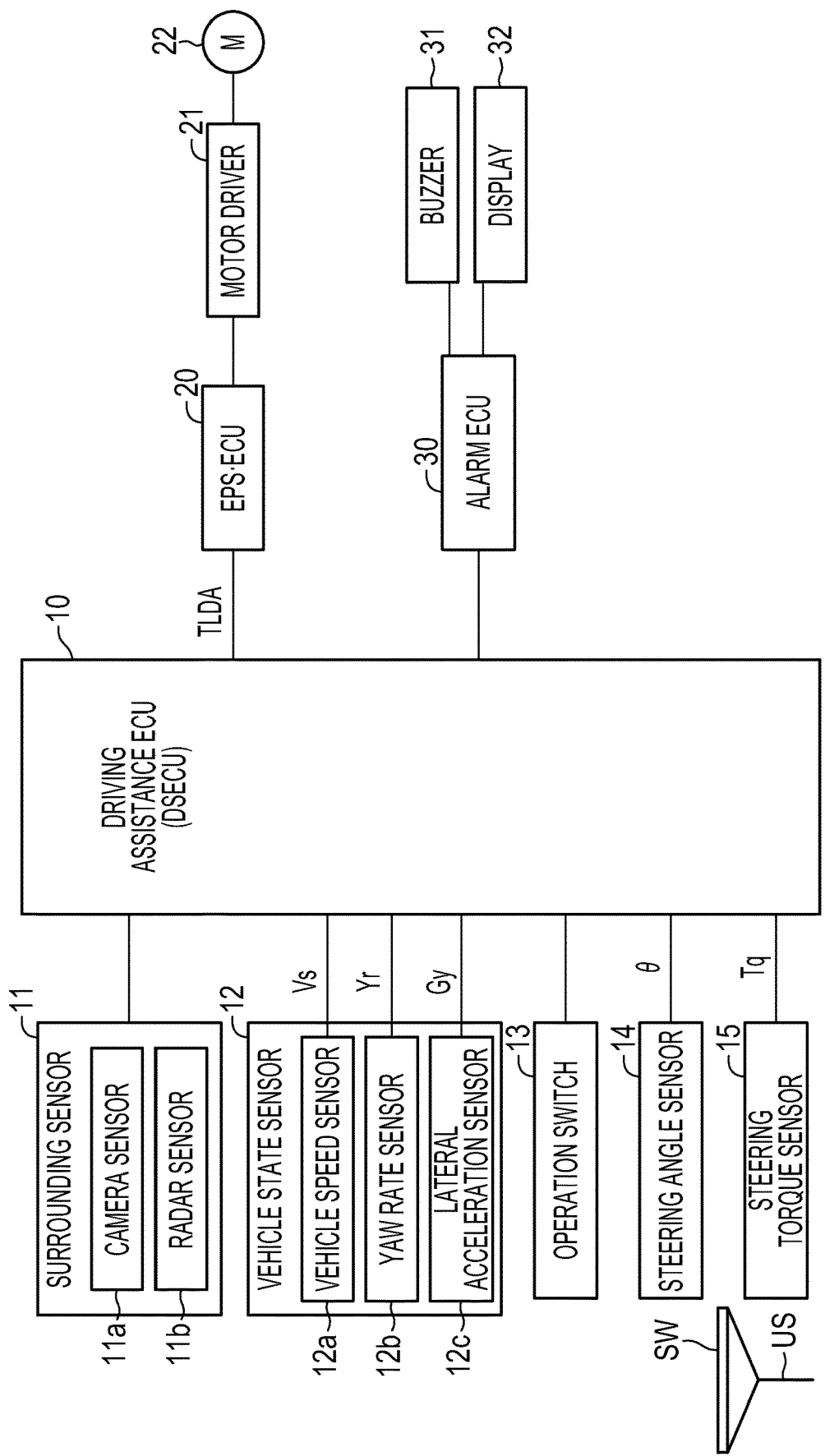

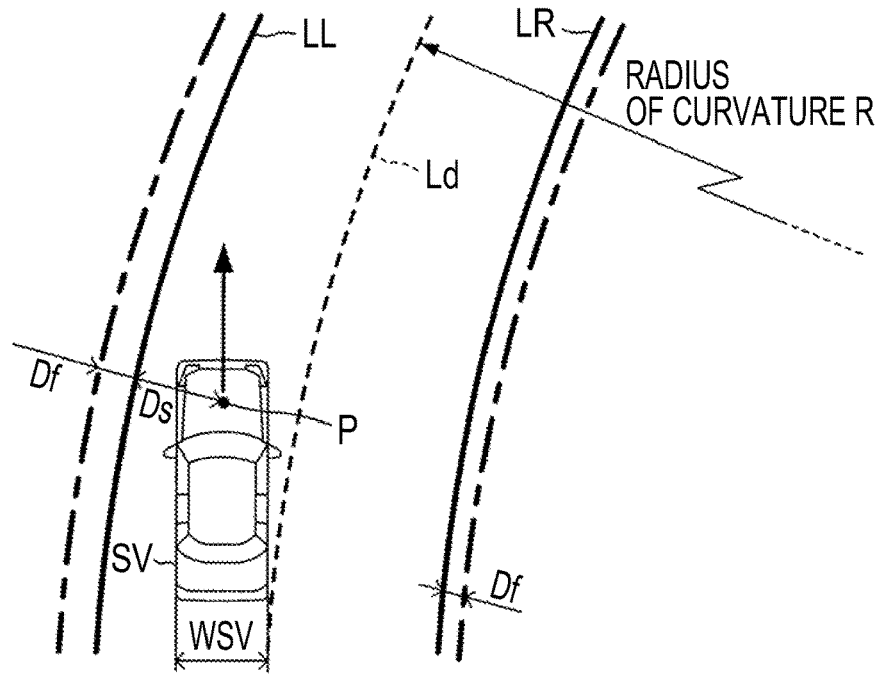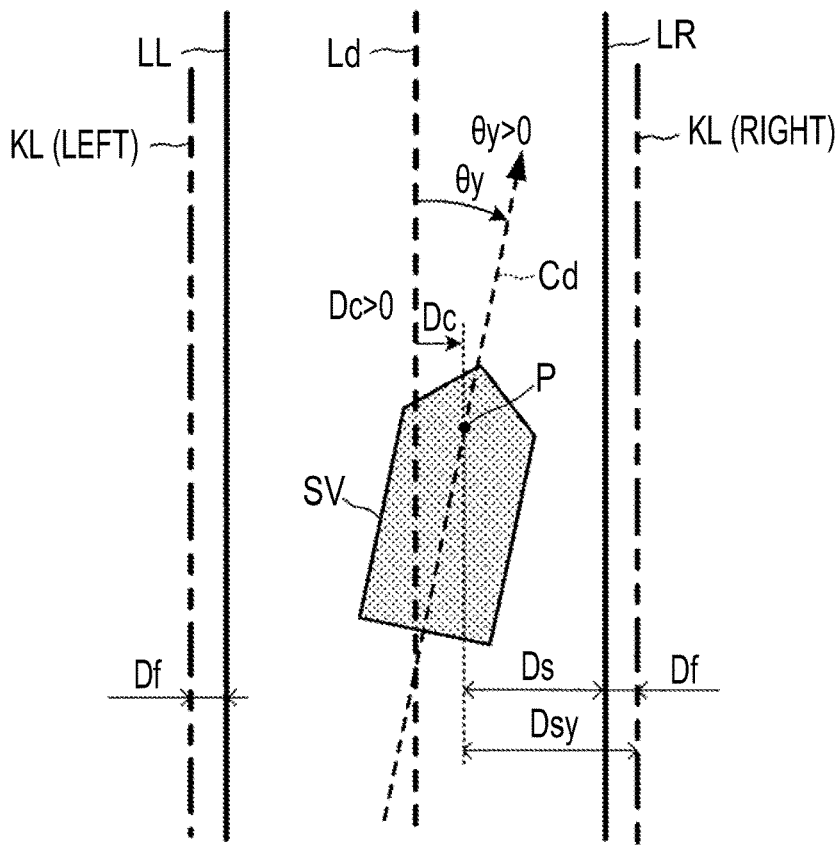

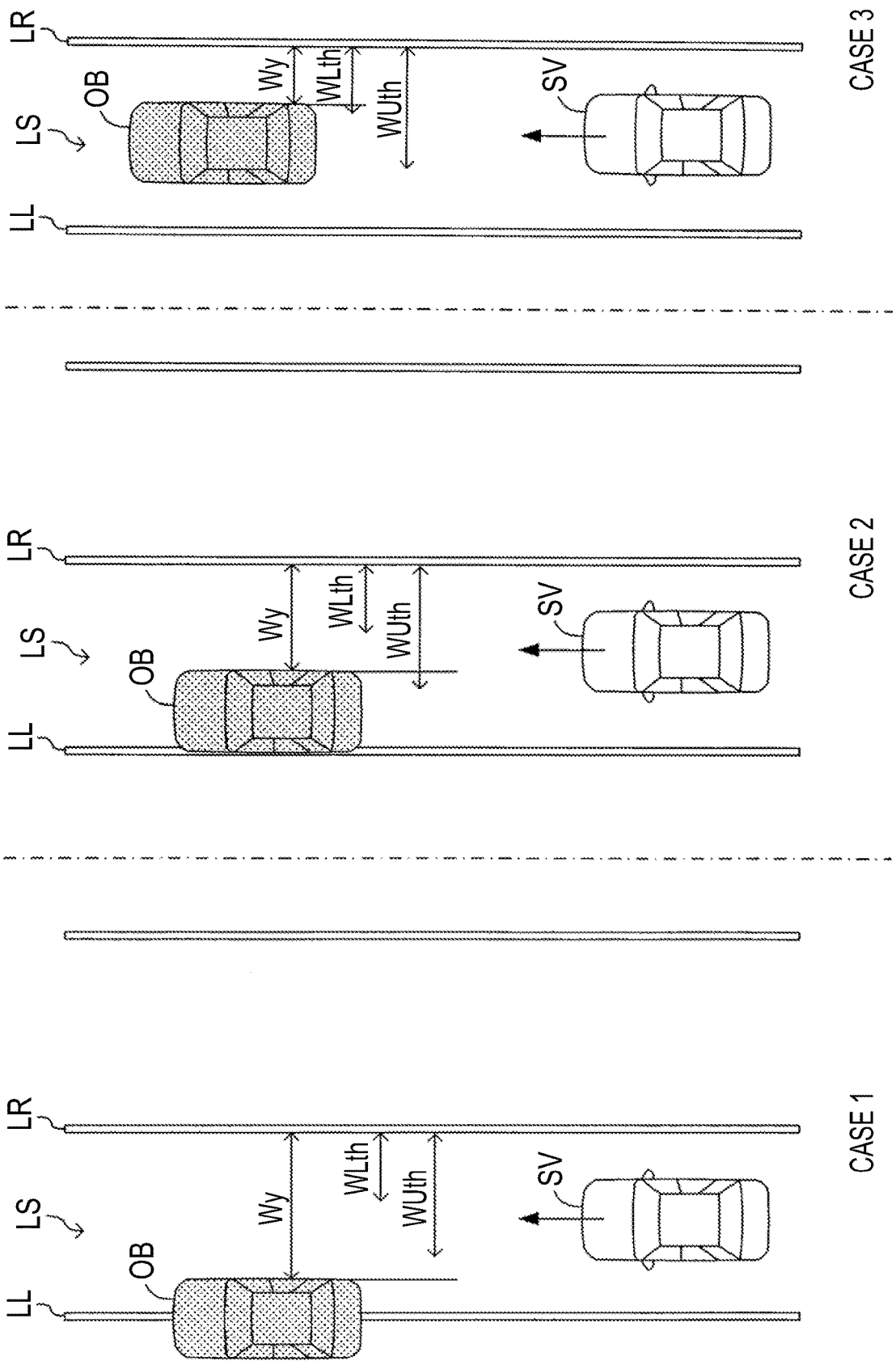

FIG. 4
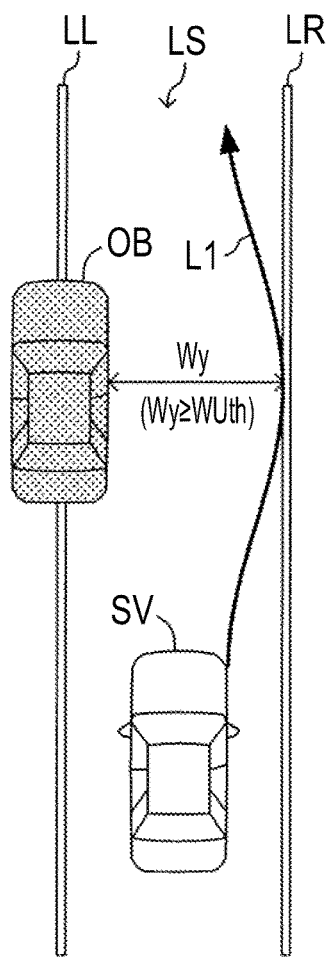
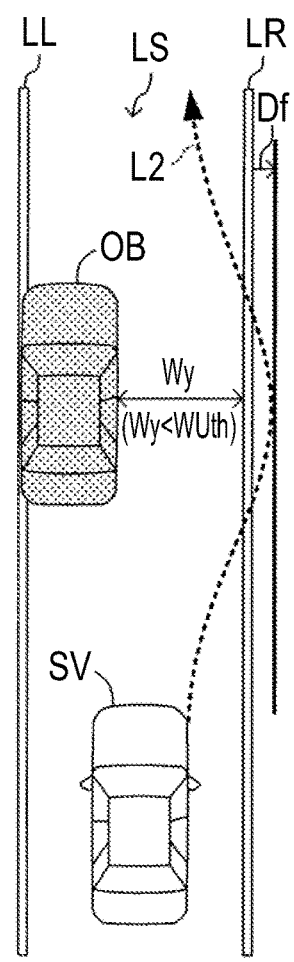
CASE 1          CASE 2

TRACK DEVIATION PREVENTION DEVICE

CROSS-REFERENCE TO RELATED APPLICATION

This application claims priority to Japanese Patent Application No. 2021-176311 filed on Oct. 28, 2021, incorporated herein by reference in its entirety.

BACKGROUND

1. Technical Field

The present disclosure relates to a track deviation prevention device that can execute track deviation prevention steering control of changing a rudder angle of a host vehicle such that the host vehicle does not deviate from a track (for example, travel lane) partitioned by right side and left side deviation regulation lines.

2. Description of Related Art

One of lane deviation prevention devices in the related art (hereinafter, simply referred to as a "related-art device") acquires a distance (for convenience, referred to as a "margin width") Wo between a side end point in a travel lane Ls of an object OB and a right white line LR in a case where the object OB is present on a front left side of a host vehicle SV as shown in FIG. 9, for example. Moreover, in a case where the margin width Wo is smaller than a vehicle width Wc of the host vehicle SV (Wo<Wc), the related-art device determines that the host vehicle SV deviates from the travel lane Ls, and prohibits the execution of the track deviation prevention steering control (see, for example, Japanese Unexamined Patent Application Publication No. 2010-23605 (JP 2010-23605 A)).

SUMMARY

However, since the related-art device uniformly prohibits the execution of the track deviation prevention steering control in a case where the margin width Wo is smaller than the vehicle width We of the host vehicle SV, there is a problem that a function of the track deviation prevention steering control cannot be used even in a case where the host vehicle SV deviates more than needed from the travel lane Ls when the host vehicle SV passes by a side of the object OB.

The present disclosure has been made to address the problem described above. That is, the present disclosure is to provide a track deviation prevention device capable of appropriately executing track deviation prevention steering control in a case where an object is present in front of a host vehicle.

An aspect of the present disclosure relates to a track deviation prevention device (hereinafter, also referred to as a "present disclosure device") including a surrounding sensor (11), a rudder angle changing actuator (21, 22), and a control unit (10, 20). The surrounding sensor is configured to acquire surrounding information including information on positions of a left side lane marking (LL) and a right side lane marking (LR) of a road on which a host vehicle (SV) travels, and information on a position of an object (OB) positioned in front of the host vehicle. The rudder angle changing actuator is configured to change a rudder angle of the host vehicle. The control unit is configured to execute track deviation prevention steering control of changing the rudder angle of the host vehicle by controlling the rudder angle changing actuator such that the host vehicle does not deviate from a track (step S670, and step S760 to step S780), in a state in which the host vehicle travels on the track between a left side deviation regulation line (KL (left)) and a right side deviation regulation line (KL (right)), in a case where a steering control start condition that is satisfied when a probability that the host vehicle deviates from the track is high is satisfied (step S660: Yes).

The left side deviation regulation line (KL (left)) is a line obtained by moving the left side lane marking (LL) to a left side or a right side (generally the left side) by a "first left side distance (any of a1 to a5) equal to or larger than zero". The left side deviation regulation line coincides with the left side lane marking (for example, a left white line) that partitions the travel lane when the first left side distance is "0".

The right side deviation regulation line (KL (right)) is a line obtained by moving the right side lane marking (LR) to a right side or a left side (generally the right side) by a "first right side distance (any of a1 to a5) equal to or larger than zero". The right side deviation regulation line coincides with the right side lane marking (for example, a right white line) that partitions the travel lane when the first right side distance is "0".

Further, the control unit is configured to acquire, as a lateral margin distance (Wy), a larger distance out of a distance of a space formed between the object and the left side lane marking in a track width direction and a distance of a space formed between the object and the right side lane marking in the track width direction in a case where the object (OB) is present in front of the host vehicle (SV) when the host vehicle (SV) travels on the track (step S570), or a larger distance out of a distance of a space formed between the object and the left side deviation regulation line in the track width direction and a distance of a space formed between the object and the right side deviation regulation line in the track width direction based on the surrounding information in a case where the object is present in front of the host vehicle when the host vehicle travels on the track (step S570), determine whether or not a deviation passage determination condition that is satisfied in a case where a probability that the host vehicle crosses one of the left side deviation regulation line and the right side deviation regulation line to deviate from the track when the host vehicle passes by a side of the object is high is satisfied, based on at least the lateral margin distance (step S570), and further move at least a deviation regulation line on a side on which the host vehicle is expected to cross when the host vehicle passes by the side of the object out of the left side deviation regulation line and the right side deviation regulation line to an outside of the track by a predetermined offset distance (any of b1 to b5) in a case where a determination is made that the deviation passage determination condition is satisfied (step S570: Yes) (step S630: No, step S680, and step S650).

Accordingly, in a case the probability that the host vehicle crosses one of the "left side lane marking and the right side lane marking (or left side deviation regulation line and the right side deviation regulation line)" to deviate from the track when the host vehicle passes by the side of the object is high, the deviation regulation line on the side on which the host vehicle is expected to cross is further moved to the outside of the track by the offset distance. Therefore, even in a case where the host vehicle deviates from the track determined by the "deviation regulation line before being moved by the offset distance" when the host vehicle passes by the side of the object, the track deviation prevention steering control is executed such that the host vehicle does not deviate from the track determined by the "deviation regulation line after being moved by the offset distance". Therefore, it is possible to cause the host vehicle to travel such that the host vehicle does not significantly deviate to the outside of the deviation regulation line. Further, since the deviation regulation line on the side on which the host vehicle is expected to cross is further moved to the outside of the track by the offset distance, the deviation between a steering operation by a driver of the host vehicle and the steering by the track deviation prevention steering control is reduced. Therefore, it is possible to reduce a probability of giving a sense of discomfort to the driver of the host vehicle.

In the aspect (step S570, step S580, and a modification example 1) of the present disclosure device, the control unit may be configured to determine whether or not the lateral margin distance (Wy) is equal to or smaller than a predetermined first distance threshold value (WUth), and determine that the deviation passage determination condition is satisfied at least in a case where a determination is made that the lateral margin distance is equal to or smaller than the first distance threshold value, and to change the first distance threshold value based on a kind of the object present in front of the host vehicle.

The first distance threshold value used to decide whether the vehicle deviates from the track or a travel lane when the host vehicle passes by the side of the object differs in accordance with the kind of the object (for example, a vehicle, a two-wheeled vehicle, and a pedestrian). Therefore, with this aspect, it is possible to accurately determine whether or not the deviation passage determination condition is satisfied.

In the aspect of the present disclosure device, the control unit may be configured to determine whether or not the lateral margin distance (Wy) is equal to or smaller than a predetermined first distance threshold value (WUth) and is equal to or larger than a predetermined second distance threshold value (WLth) smaller than the first distance threshold value (step S570), and determine that the deviation passage determination condition is satisfied at least in a case where a determination is made that the lateral margin distance is equal to or smaller than the first distance threshold value and is equal to or larger than the second distance threshold value (step S570: Yes, and step S580).

With this aspect, a determination is made that the deviation passage determination condition is satisfied in a case where the lateral margin distance (Wy) is between the second distance threshold value (WLth) and the first distance threshold value (WUth). As described above, the reason why the lateral margin distance (Wy) is compared with the second distance threshold value (WLth) in addition to the first distance threshold value (WUth) is that, in a case where the lateral margin distance (Wy) is smaller than the second distance threshold value (WLth), a probability that the object is a preceding vehicle that travels in front of the host vehicle is high, and thus a probability that the host vehicle passes by the side of the object is low. Therefore, with this aspect, it is possible to more accurately determine whether or not the deviation passage determination condition is satisfied.

In this case, the control unit may be configured to change the first distance threshold value based on a kind of the object present in front of the host vehicle. With this aspect, it is possible to accurately determine whether or not the deviation passage determination condition is satisfied in accordance with the kind of the object.

Further, in this case, the control unit may be configured to change the second distance threshold value based on the kind of the object present in front of the host vehicle. With this aspect, it is possible to more accurately determine whether or not the deviation passage determination condition is satisfied in accordance with the kind of the object.

In the aspect of the present disclosure device, the control unit may be configured to determine whether or not magnitude of steering torque applied to a steering wheel of the host vehicle is equal to or larger than an override determination threshold value in a case where the track deviation prevention steering control is executed (step S850), and stop the track deviation prevention steering control in a case where a determination is made that the magnitude of the steering torque is equal to or larger than the override determination threshold value (step S850: Yes, and step S860 to step S880).

Further, the control unit may be configured to change the override determination threshold value to a smaller value at least in one case out of a case where the track deviation prevention steering control is executed and a case where the track deviation prevention steering control is executable than a case where a determination is not made that the deviation passage determination condition is satisfied (step S820 to step S840). Stated another way, the control unit sets the override determination threshold value in a case where a determination is made that the deviation passage determination condition is satisfied to a smaller value than the override determination threshold value in a case where a determination is not made that the deviation passage determination condition is satisfied.

With this aspect, in a case where the probability that the host vehicle crosses one of the "left side deviation regulation line and the right side deviation regulation line" to deviate from the track when the host vehicle passes by the side of the object is high, the override determination threshold value is changed to a small value. Therefore, in this case, when there is a significant steering operation by the driver, the steering operation is detected in an earlier stage, so that the deviation prevention steering control is stopped. Therefore, it is possible to reduce a frequency with which the driver feels annoyed with the deviation prevention steering control.

In the above description, in order to help the understanding of the present disclosure, the name and/or sign used in an embodiment to be described below are added in parentheses to a configuration of the present disclosure corresponding to the embodiment. However, each component of the present disclosure is not limited to the embodiment defined by the above name and/or sign.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a schematic configuration diagram of a track deviation prevention device (embodiment device) according to an embodiment of the present disclosure;

FIG. 2A is a plan view of a curved travel lane;

FIG. 2B is a plan view of a straight travel lane;

FIG. 3 is a plan view of a travel lane showing various cases where an object is present in front of a host vehicle;

FIG. 4 is a plan view of the travel lane showing various cases where the object is present in front of the host vehicle;

DETAILED DESCRIPTION OF EMBODIMENTS

Configuration

Figure 5:
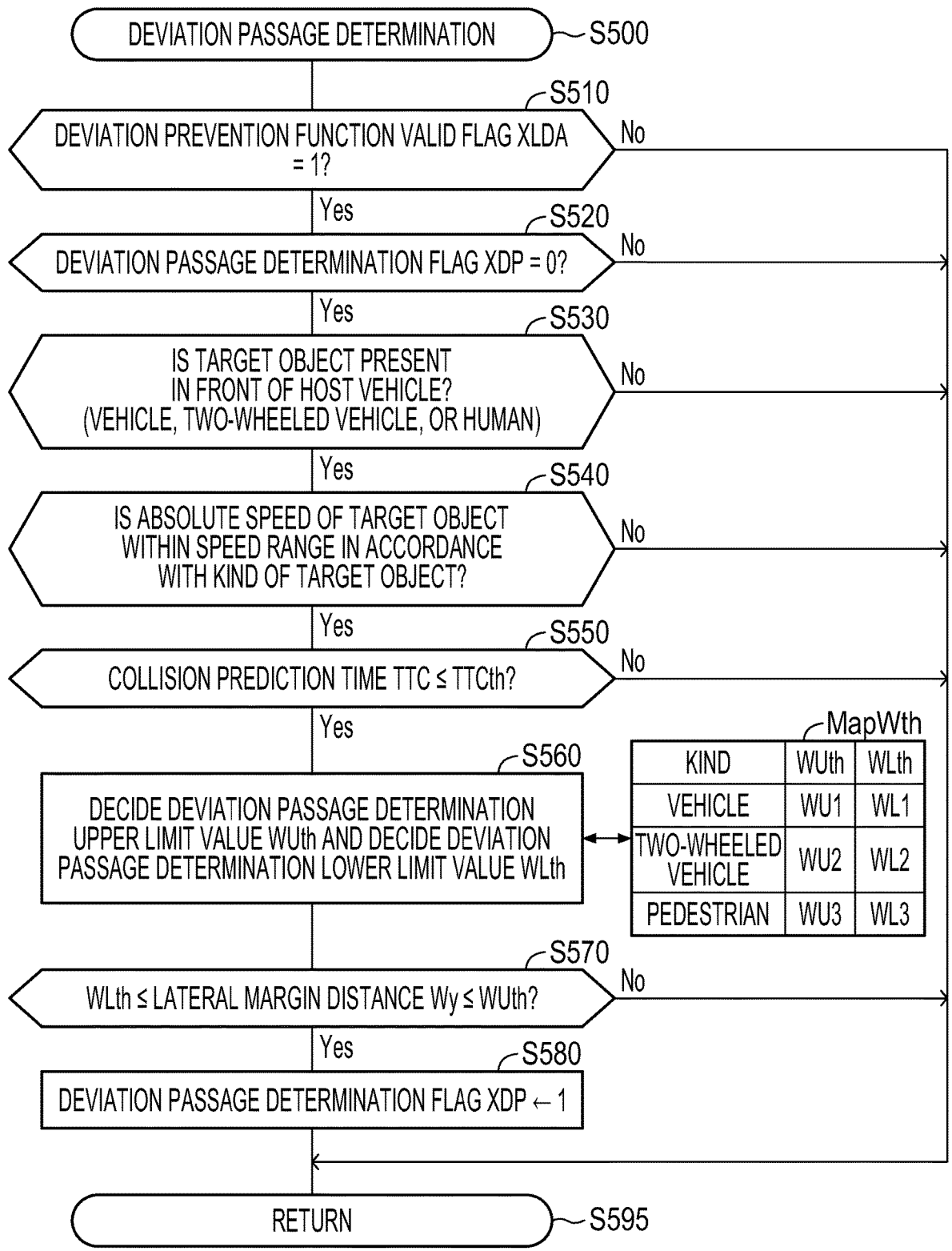
FIG. 5 is a flowchart showing a routine executed by a CPU of a driving assistance ECU shown in FIG. 1.

A track deviation prevention device (hereinafter, may be referred to as a "lane deviation avoidance device" or an "embodiment device") according to an embodiment of the present disclosure is mounted on a vehicle (not shown). The vehicle on which the embodiment device is mounted may be referred to as a "host vehicle" for distinction from another vehicle.

As shown in FIG. 1, the embodiment device includes a driving assistance ECU 10, an electric power steering ECU (hereinafter, referred to as an "EPS•ECU") 20, and an alarm ECU 30. In the following, the driving assistance ECU 10 is simply referred to as a "DSECU".

Each of these ECUs is an electric control unit equipped with a microcomputer as a main part. These ECUs are connected to each other such that information can be transmitted and received via a controller area network (CAN) (not shown). These ECUs may be integrated into one ECU.

The microcomputer includes a CPU, a ROM, a RAM, a non-volatile memory, an interface I/F, and the like. The CPU realizes various functions by executing an instruction (program and routine) stored in the ROM.

The embodiment device includes a surrounding sensor 11, a vehicle state sensor 12, an operation switch 13, a steering angle sensor 14, and a steering torque sensor 15. The DSECU is connected to these sensors and switch to receive detection signals or output signals thereof. It should be noted that each of these sensors and switch may be connected to an ECU other than the DSECU. In that case, the DSECU receives the detection signal or output signal of the sensor from the ECU to which the "sensors or switch" are connected via the CAN.

The surrounding sensor 11 includes a camera sensor 11*a*, a radar sensor 11*b*, and a fusion unit (ECU) (not shown).

The camera sensor 11*a* includes a "stereo camera and an image processing unit (ECU)" (not shown). The stereo camera images a landscape of a "left side region and a right side region" in front of a host vehicle SV, and acquires a left front image data and a right front image data.

As shown in FIGS. 2A and 2B, the image processing unit of the camera sensor 11*a* recognizes (detects) lane marking (that is, left side lane marking LL and right side lane marking LR) based on the left front image data and the right front image data.

A typical example of a lane marking is a white line (or yellow line) on a road. Therefore, in the following, the lane marking is also simply referred to as a "white line". The left side lane marking LL and the right side lane marking LR are referred to as a left white line LL and a right white line LR, respectively.

Based on the recognized "left white line LL and right white line LR", the image processing unit acquires lane information including information listed below each time a predetermined time elapses. The lanes partitioned by the left white line LL and the right white line LR are also referred to as a "travel lane".

Data indicating a shape of the travel lane in which the host vehicle SV travels, and here, data indicating a "radius of curvature R or curvature Cv" of a lane center line Ld.

It should be noted that the lane center line Ld is a line connecting the center points of the left white line LL and the right white line LR in a lane width direction of the travel lane.

Data indicating a positional relationship between the travel lane and the host vehicle SV, and more specifically, data including, for example, parameters listed below (see FIG. 2B).

A distance Dc between the lane center line Ld and a reference point P on the host vehicle SV in the lane width direction.

The reference point P on the host vehicle SV is the center point of a left front wheel and a right front wheel on axles of the left front wheel and the right front wheel of the host vehicle SV.

A yaw angle θy is an angle formed by a direction of the lane center line Ld and a front-rear axis direction of the host vehicle SV (that is, a direction Cd in which the host vehicle SV faces).

A front-rear axis of the host vehicle SV is an axis that passes through the center of the host vehicle SV in the vehicle width direction and extends in a front-rear direction of the host vehicle SV. As shown in FIG. 2B, the yaw angle θy is an acute angle from −90° to +90°, and is "0" when the direction Cd coincides with the direction of the lane center line Ld.

Further, the image processing unit acquires object information including information listed below each time a predetermined time elapses, based on the left front image data and the right front image data.

Vertical distance Dfx of the object: the vertical distance Dfx of the object is a signed distance in the front-rear axis direction of the host vehicle SV between a front end portion of the host vehicle SV and the object.

Lateral position Dfy of the object: the lateral position Dfy of the object is a signed distance between the center position of the object and the front-rear axis of the host vehicle SV in the vehicle width direction of the host vehicle SV.

Relative speed Vfx of the object: the relative speed Vfx of the object is a difference (=Vb−Vs) between a speed Vb of the object in the front-rear axis direction of the host vehicle SV and a vehicle speed Vs of the host vehicle SV.

Information indicating a kind of the object: the information indicating the kind of the object includes information indicating whether the object is the vehicle, a two-wheeled vehicle (motorcycle and bicycle), or a pedestrian. The information indicating the kind of the object is decided based on a well-known pattern matching method. It should be noted that this function (function of recognizing the kind of the object) may be executed by the DSECU.

A distance of a space formed between the object (for example, a left side end portion of the object) and the left white line LL in a track width (lane width) direction, the distance that is also referred to as a left side distance below. It should be noted that, in a case where the object is positioned on the left white line LL, the left side distance is zero. The left side distance may be a distance of a space formed between the object (for example, the left side end portion of the object) and a "left side deviation regulation line moved by an offset distance described below (left side deviation regulation line obtained by moving the left side lane marking to a left side or a right side by a first left side distance equal to or larger than zero)" in the track width (lane width) direction.

A distance of a space formed between the object (for example, a right side end portion of the object) and the right white line LR in a track width (lane width) direction, the distance that is also referred to as a right side distance below. It should be noted that, in a case where the object is positioned on the right white line LR, the right side distance is zero. The right side distance may be a distance of a space formed between the object (for example, the right side end portion of the object) and a "right side deviation regulation line moved by an offset distance described below (right side deviation regulation line obtained by moving the right side lane marking to a right side or a left side by a first right side distance equal to or larger than zero)" in the track width (lane width) direction. A larger distance out of the left side distance and the right side distance is also referred to as a "lateral margin distance or an object side surface distance".

The above information acquired by the image processing unit is also referred to as "camera sensor information".

The radar sensor 11b includes a "radar wave transmitter/receiver, and a radar wave processing unit" realized by an ECU (not shown).

For example, the radar wave transmitter/receiver emits millimeter waves (that is, electromagnetic waves in a millimeter wave band) to a surrounding region of the host vehicle SV including a front region of the host vehicle SV, and receives reflected waves generated by reflecting the emitted millimeter waves by a portion of a three-dimensional object (that is, reflection point). It should be noted that the radar sensor 11b may be a radar sensor that uses the electromagnetic waves (radar waves) in a frequency band other than the millimeter wave band.

The radar wave processing unit recognizes the object based on reflection point information including a phase difference between the transmitted millimeter waves and the received reflected waves, an attenuation level of the reflected waves, a time from when the millimeter waves are transmitted to when the reflected waves are received, and the like. The radar wave processing unit acquires the recognized vertical distance Dfx of the object, an orientation θp of the object with respect to the host vehicle SV, and the relative speed Vfx of the object. Further, the radar wave processing unit acquires positions of a side surface and a rear surface of the object based on the reflection point information. The information acquired by the radar wave processing unit is also referred to as "radar sensor information".

The fusion unit of the surrounding sensor 11 integrates the camera sensor information and the radar sensor information to generate fusion information. The fusion information includes object information, such as the "vertical distance Dfx, the lateral position Dfy, the orientation θp, the relative speed Vfx, the right side distance, the left side distance, and the kind" of the object described above, and the lane information. The fusion unit transmits the fusion information to the DSECU each time a predetermined time elapses. It should be noted that the function of the fusion unit may be realized by the DSECU. Further, the surrounding sensor 11 may include, for example, solely the camera sensor 11a. In this case, the fusion unit can be omitted.

The vehicle state sensor 12 shown in FIG. 1 is a sensor that acquires information (parameter) indicating a motion state of the host vehicle. The vehicle state sensor 12 includes a vehicle speed sensor 12a, a yaw rate sensor 12b, and a lateral acceleration sensor 12c.

The vehicle speed sensor 12a detects a traveling speed (vehicle speed) Vs of the host vehicle SV and outputs a signal indicating the vehicle speed Vs.

The yaw rate sensor 12b detects a yaw rate YRt of the host vehicle SV and outputs a signal indicating the yaw rate YRt (actual yaw rate YRt).

The lateral acceleration sensor 12c detects the acceleration (that is, lateral acceleration) Gy of the host vehicle SV in the vehicle width direction, and outputs a signal indicating the lateral acceleration Gy.

The operation switch 13 is a switch operated by a driver of the host vehicle SV in order for the driver to select whether or not to set the track deviation prevention function (lane deviation avoidance function) valid. The operation switch 13 outputs an on signal (high-level signal) while being pressed by the driver, and outputs an off signal (low-level signal) while not being pressed by the driver.

A track deviation prevention function is "steering control of the host vehicle SV" of applying steering assist torque to a steering mechanism to change the rudder angle such that the position of the host vehicle SV (side surface of the host vehicle SV) does not deviate from the track to the outside of the track. The steering assist torque (steering assist force) may be referred to as "deviation prevention torque". It should be noted that the track is a portion of the road between the "left side deviation regulation line determined based on the left white line LL" and the "right side deviation regulation line determined based on the right white line LR", and the most portion thereof substantially coincides with the "travel lane".

The steering angle sensor 14 detects a steering angle (rotation angle of a steering wheel SW) θ of the host vehicle SV and outputs a signal indicating the steering angle θ.

The steering torque sensor 15 detects steering torque Tq applied to a torsion bar incorporated between a steering shaft US of the host vehicle SV and a steering gear mechanism (not shown), and outputs a signal indicating the steering torque Tq.

The EPS•ECU 20 is a well-known control unit of an electric power steering system. The EPS•ECU 20 is connected to a motor driver 21.

The motor driver 21 is connected to a steering motor 22. The steering motor 22 is incorporated in the steering gear mechanism (not shown). The steering motor 22 is an electric motor, and generates torque by power supplied from an in-vehicle battery (not shown) via the motor driver 21. The torque is transmitted to the steering gear mechanism, so that right and left steering wheels are steered. That is, the steering motor 22, together with the motor driver 21, constitutes a "rudder angle changing actuator" that changes the rudder angle of the host vehicle SV.

In a case where the EPS•ECU 20 receives a steering command from the DSECU in a state in which the track deviation prevention function is set valid, the EPS•ECU 20 drives the motor driver 21 based on a target torque specified by the steering command to drive the steering motor 22. That is, the EPS•ECU 20 changes the rudder angle of the host vehicle SV based on the steering command.

The alarm ECU 30 is connected to a buzzer 31 and a display 32. The alarm ECU 30 can sound the buzzer 31 in accordance with the instruction from the DSECU to alert the driver. Further, the alarm ECU 30 can turn on an alerting mark (for example, a warning lamp) on the display 32 or display an alarm image in accordance with the instruction from the DSECU.

Outline of Operation

In a case where the track deviation prevention function is set to the valid state, the DSECU monitors whether or not a "start condition of the track deviation prevention steering control (hereinafter, may be simply referred to as a "steering control start condition")" is satisfied. The steering control start condition is a condition that is satisfied in a case where a probability that the host vehicle SV (vehicle body of the host vehicle SV) deviates from the track partitioned by the right and left "deviation regulation lines" (is moved to the outside of the track) is high. An example of the steering control start condition will be described below.

In a case the DSECU determines that the steering control start condition is satisfied, the DSECU transmits the steering command to the EPS•ECU 20 such that the host vehicle SV travels in the track (that is, the lane center line Ld side with respect to the right side and left side deviation regulation lines) to change the rudder angle of the host vehicle SV. The control of automatically changing the rudder angle is also referred to as "deviation prevention steering control". The deviation prevention steering control itself is a well-known control. The deviation prevention steering control is not started in a case where the probability that the host vehicle SV deviates from the track is low (in a case where the steering control start condition is not satisfied) even when the track deviation prevention function is in the valid state.

The left side deviation regulation line and the right side deviation regulation line are generally the left white line LL and the right white line LR, respectively, when the travel lane of the host vehicle SV is a straight road, for example. In the following, for the sake of simplicity, it is assumed that the left side deviation regulation line and the right side deviation regulation line coincide with the left white line LL and the right white line LR, respectively. Therefore, the travel lane partitioned by the left white line LL and the right white line LR coincides with a part of the road (that is, the track) partitioned by the left side deviation regulation line and the right side deviation regulation line.

By the way, as shown in Cases 1 to 3 of FIG. 3, in a case where the host vehicle SV travels in the travel lane Ls, the object (the obstacle, for example, another vehicle, the two-wheeled vehicle, and the pedestrian) OB may be present in front of the host vehicle SV. In this case, the DSECU acquires the lateral margin distance Wy described above.

The lateral margin distance Wy is a distance between a right side end surface of the object OB and the right white line LR when the object OB (center of the object in the lane width direction) is positioned on the left side of the lane center line Ld. The lateral margin distance Wy is a distance between the left side end surface of the object OB and the left white line LL when the object OB is positioned on the right side of the lane center line Ld.

As shown in Case 1 of FIG. 3, in a case where the lateral margin distance Wy of the object OB is sufficiently larger (that is, in a case where lateral margin distance Wy>first distance threshold value WUth), most of the drivers of the host vehicle SV pass by the side of the object OB without causing the host vehicle SV to deviate from the travel lane Ls. That is, for example, in a case where the object OB is positioned on the left side of the travel lane Ls and the lateral margin distance Wy is sufficiently large, as shown by a solid line L1 in Case 1 of FIG. 4, the driver of the host vehicle SV steers the host vehicle SV such that a right side surface of the host vehicle SV does not cross the right white line LR when the host vehicle SV passes by the side of the object OB.

In this case, there is a high probability that the deviation prevention steering control is not executed. Further, in this case, even when the deviation prevention steering control is executed, the torque applied to the steering wheel SW is small, so that a probability that the driver feels annoyed with the deviation prevention steering control is low.

On the other hand, as shown in Case 2 of FIG. 3, in a case where the lateral margin distance Wy of the object OB is not sufficiently large (that is, in a case where lateral margin distance Wy≤first distance threshold value WUth), most of the drivers of the host vehicle SV pass by the side of the object OB after causing the host vehicle SV to deviate from the travel lane Ls. That is, for example, in a case where the object OB is positioned on the left side of the travel lane Ls and the lateral margin distance Wy is not sufficiently large, as shown by a broken line L2 in Case 2 of FIG. 4, the driver of the host vehicle SV steers the host vehicle SV such that the right side surface of the host vehicle SV crosses the right white line LR when the host vehicle SV passes by the side of the object OB.

In this case, when the right side and left side deviation regulation lines remain set to "right white line LR and left white line LL" as in the related-art device, large torque is applied to the steering wheel SW by the deviation prevention steering control. Therefore, there is a high probability that the driver feels annoyed with the deviation prevention steering control.

The related-art device can be configured to set the track deviation prevention function invalid in such cases (see, for example, Case 2 of FIG. 3 and Case 2 of FIG. 4). However, in that case, the deviation prevention steering control is not executed even in a case where the driver causes the host vehicle SV to deviate from the deviation regulation line more than needed (that is, in a case where the host vehicle SV significantly deviates from the travel lane Ls). As a result, the related-art device configured as described above cannot sufficiently utilize the track deviation prevention function.

Therefore, as a result of repeated studies, the present inventors have found that whether or not the driver causes the host vehicle SV to deviate from the travel lane Ls in a case where the host vehicle SV passes by the side of the object OB can be determined based on whether or not the lateral margin distance Wy is equal to or smaller than the threshold value WUth. The threshold value WUth is a value that is changed in accordance with the kind of the object (for example, the vehicle, the two-wheeled vehicle, and the pedestrian), and is referred to as a "deviation passage determination upper limit value WUth" or a "first distance threshold value WUth".

More specifically, in a case where the lateral margin distance Wy is larger than the deviation passage determination upper limit value WUth, a large number of drivers cause the host vehicle SV to pass by the side of the object OB without causing the host vehicle SV to deviate from the travel lane Ls (see Case 1 of FIG. 3 and Case 1 of FIG. 4). On the other hand, in a case where the lateral margin distance Wy is equal to or smaller than the deviation passage determination upper limit value WUth, a large number of drivers cause the host vehicle SV to pass the side of the object OB while causing the host vehicle SV to deviate from the travel lane Ls (see Case 2 of FIG. 3 and Case 2 of FIG. 4).

It should be noted that, as shown in Case. 3 of FIG. 3, the present inventors also have found that, in a case where the lateral margin distance Wy of the object OB is smaller than a "deviation passage determination lower limit value WLth smaller than the deviation passage determination upper limit value WUth", a probability that the object OB is a preceding vehicle is high and the driver of the host vehicle SV does not try to pass by the side of the object OB (does not try to overtake). That is, in this case, a probability that the host vehicle SV deviates from the travel lane Ls is low. The deviation passage determination lower limit value WLth is also a predetermined value to be changed in accordance with the kind of the object OB, and may be referred to as a "second distance threshold value WLth".

Based on the such findings, the embodiment device is configured to compare the lateral margin distance Wy with each of the deviation passage determination upper limit value (first distance threshold value) WUth and the deviation passage determination lower limit value (second distance threshold value) WLth, and determine whether or not a probability that the host vehicle SV crosses any of the left white line LL and the right white line LR to deviate from the travel lane Ls to the outside is high.

Moreover, in a case where the embodiment device determines that a probability that the host vehicle SV deviates from the travel lane Ls when the host vehicle SV passes by the side of the object OB is high (that is, in a case where WLth≤Wy≤WUth), the embodiment device maintains the valid state of the lane deviation avoidance function, and then moves a "line on a deviation side" out of the "left side deviation regulation line (left white line LL in the present example)" and the "right side deviation regulation line (right white line LR in the present example)" to the outside of the track by a "predetermined offset distance". The outside of the track is the deviation side with respect to the track, and means a direction in which the host vehicle SV is expected to deviate from the track.

As a result, the host vehicle SV is caused to travel, for example, as shown by the broken line L2 in Case 2 of FIG. 4. In this case, even when the deviation prevention steering control is executed, the torque applied to the steering wheel SW is small, so that a probability that the driver feels annoyed with the deviation prevention steering control is low.

Further, in a case where the magnitude (|Tq| of the steering torque Tq detected by the steering torque sensor 15 is equal to or larger than an override determination threshold value TqORth, the embodiment device sets the track deviation prevention function invalid such that the steering operation of the driver is prioritized (overridden) over the track deviation prevention steering control.

It should be noted that, in a case where the embodiment device determines that a probability that the host vehicle SV deviates from the travel lane Ls when the host vehicle SV passes by the side of the object OB is high (that is, in a case where WLth≤Wy≤WUth), the embodiment device changes the override determination threshold value TqORth from a normal first predetermined value TqH to a "second predetermined value TqL smaller than the first predetermined value TqH".

As a result, in a case where a probability that the host vehicle SV deviates from the travel lane Ls when the host vehicle SV passes by the side of the object OB is high, when the driver intentionally performs a significant steering operation, a probability that the deviation prevention steering control is not executed (probability that the deviation prevention steering control is stopped) is high. Therefore, in a case where the driver intentionally performs a significant steering operation when the host vehicle SV passes by the side of the object OB, the steering operation of the driver is more likely to be prioritized, so that it is possible to reduce a frequency with which the driver feels annoyed with the deviation prevention steering control.

Actual Operation

The CPU of the DSECU (hereinafter, simply referred to as "CPU") executes each of the routines shown by the flowcharts of FIGS. 5 to 8 each time a predetermined time elapses. It should be noted that various flags used below are set to "0" in an initialization routine executed by the CPU when an ignition•key•switch (not shown) of the host vehicle SV is moved from an off position to an on position. Further, in the initialization routine, the left side deviation regulation line is set to the left white line LL and the right side deviation regulation line is set to the right white line LR.

1. Deviation Passage Determination

Therefore, at a predetermined timing, the CPU starts the process from step S500 in FIG. 5 and proceeds to step S510 to determine whether or not a value of a deviation prevention function valid flag XLDA is "1". The deviation prevention function valid flag XLDA is also simply referred to as a "valid flag XLDA".

The CPU executes a routine (not shown), determines whether or not a deviation prevention function valid condition is satisfied, and sets the value of the valid flag XLDA to "1" in a case where the deviation prevention function valid condition is satisfied. The deviation prevention function valid condition is satisfied, for example, in a case where both the following conditions A1 and A2 are satisfied.

Deviation Prevention Function Valid Condition (Condition A1) The operation switch 13 is pressed while the deviation prevention function is set invalid.

(Condition A2) A predetermined time (invalidity duration time) has elapsed from a point in time when the deviation prevention function is set invalid.

It should be noted that the CPU executes a routine (not shown), determines whether or not a deviation prevention function invalid condition is satisfied, and sets the value of the valid flag XLDA to "0" in a case where the deviation prevention function invalid condition is satisfied. The deviation prevention function invalid condition is satisfied, for example, in a case where any of the following conditions B1 and B2 is satisfied.

Deviation Prevention Function Invalid Condition (Condition B1) The operation switch 13 is pressed while the deviation prevention function is set valid.

(Condition B2) In a state in which the deviation prevention function is set valid, the magnitude (|Tq|) of the steering torque Tq is equal to or larger than the override determination threshold value TqORth due to the steering operation (override) of the driver (see steps S850 and S860 described below).

In a case where the value of the valid flag XLDA is not "1", the CPU determines "No" in step S510, proceeds directly to step S595, and temporarily terminates the present routine. On the other hand, in a case where the value of the valid flag XLDA is "1", the CPU determines "Yes" in step S510 and proceeds to step S520.

In step S520, the CPU determines whether or not a value of a deviation passage determination flag XDP is "0". The value of the deviation passage determination flag XDP is set to "1" in a case where a determination is made that a probability that the host vehicle SV deviates from the "travel lane partitioned by the left side lane marking and the right side lane marking (more specifically, the track partitioned by the left side deviation regulation line before being moved by the offset distance described below and the right side deviation regulation line before being moved by the offset distance described below)" when the host vehicle SV passes by the side of the object OB is high (see steps S570 and S580 described below).

In a case where the value of the deviation passage determination flag XDP is not "0", the CPU determines "No" in step S520, proceeds directly to step S595, and temporarily terminates the present routine. On the other hand, in a case where the value of the deviation passage determination flag XDP is "0", the CPU determines "Yes" in step S520 and proceeds to step S530.

In step S530, the CPU determines whether or not the object (target object) that is a control target is present in front of the host vehicle SV based on the fusion information from the surrounding sensor 11. In the present example, the kind of the object recognized as the target object is any of the vehicle (another vehicle), the two-wheeled vehicle (motorcycle and bicycle), and the pedestrian. It should be noted that the object recognized as the target object may include other kinds of objects (for example, construction sign and traffic cone placed on the road).

In a case where the target object is not present in front of the host vehicle SV, the CPU determines "No" in step S530, proceeds directly to step S595, and temporarily terminates the present routine. On the other hand, in a case where the target object is present in front of the host vehicle SV, the CPU determines "Yes" in step S530 and proceeds to step S540.

In step S540, the CPU calculates an absolute speed Vz of the target object, and determines whether or not the absolute speed Vz is within a speed range corresponding to the kind of the target object. It should be noted that the absolute speed Vz of a certain object is calculated by adding the vehicle speed Vs of the host vehicle SV to the relative speed Vfx of the object. For example, the speed range used in step S540 is, for example, as follows. The following A, B, and C are all positive values.

In a case where the kind of the target object is the vehicle: a range of -A km/h to the vehicle speed Vs of the host vehicle SV.

In a case where the kind of the target object is the two-wheeled vehicle: a range of −B km/h to the vehicle speed Vs of the host vehicle SV.

In a case where the kind of the target object is the pedestrian: a range of −C km/h to the vehicle speed Vs of the host vehicle SV.

As a result, among the objects present in front of the host vehicle SV, the object that moves away from the host vehicle SV (that is, the object having a positive relative speed Vfx) is excluded from the target object.

In a case where the target object of which the absolute speed Vz is within the speed range described above is not present, the CPU determines "No" in step S540, proceeds directly to step S595, and temporarily terminates the present routine. On the other hand, in a case where the target object of which the absolute speed Vz is within the speed range described above is present, the CPU determines "Yes" in step S540 and proceeds to step S550.

In step S550, the CPU obtains a collision prediction time TTC for each of the target objects by the calculation. The collision prediction time TTC is a time from the present point in time to a point in time for the host vehicle SV to collide with the target object in a case where it is assumed that the host vehicle SV and the target object maintain the motion state of the present point in time. The collision prediction time TTC is calculated, for example, by dividing the vertical distance Dfx of the target object by the magnitude |Vfx| of the relative speed Vfx of the target object (TTC=Dfx/|Vfx|). It should be noted that, in a case where a plurality of objects is selected as the target object, an object having the shortest collision prediction time TTC among the objects is selected as a final target object. Further, in step S550, the CPU determines whether or not the collision prediction time TTC of the final target object is equal to or smaller than a collision time threshold value TTCth.

In a case where the collision prediction time TTC of the final target object is larger than the collision time threshold value TTCth, the CPU determines "No" in step S550, proceeds directly to step S595, and temporarily terminates the present routine. On the other hand, in a case where the collision prediction time TTC of the final target object is equal to or smaller than the collision time threshold value TTCth, the CPU determines "Yes" in step S550 and proceeds to step S560.

In step S560, the CPU applies the kind of the final target object to a look-up table (map) MapWth to decide "deviation passage determination upper limit value (first distance threshold value) WUth and deviation passage determination lower limit value (second distance threshold value) WLth" (see FIG. 3). The deviation passage determination upper limit value WUth and the deviation passage determination lower limit value WLth may be simply referred to as an "upper limit value WUth" and a "lower limit value WLth", respectively.

The look-up table MapWth defines a relationship between the kind of the object and each of the "upper limit value WUth" and the "lower limit value WLth". The upper limit value WUth is set to a value larger than the lower limit value WLth. The upper limit value WUth and the lower limit value WLth are created based on data on how a large number of drivers cause the host vehicle SV to travel (what kind of steering operation is performed) when the host vehicle SV passes by the side of the target object for each kind of the target object. According to the look-up table MapWth, for example, in a case where the kind of the object is the vehicle, the upper limit value WUth and the lower limit value WLth are set to a value WU1 and a value WL1, respectively.

Next, the CPU proceeds to step S570 and acquires the lateral margin distance Wy described above. Further, in step S570, the CPU determines whether or not the "lateral margin distance Wy is equal to or larger than the lower limit value WLth and is equal to or smaller than the upper limit value WUth". That is, the CPU determines whether or not the deviation passage determination condition indicated by the following inequality is satisfied.

Deviation Passage Determination Condition

WLth≤Wy≤WUth

For example, in a case where the target object OB is present at the position shown in Case 1 of FIG. 3 (position straddling the left white line of the travel lane), the lateral margin distance Wy is larger than the upper limit value WUth. In this case, most of the drivers of the host vehicle SV pass by the side of the final target object OB without causing the host vehicle SV to deviate from the "track partitioned by the left side deviation regulation line before being moved by the offset distance described below and the right side deviation regulation line before being moved by the offset distance described below". For example, in this case, most of the drivers of the host vehicle SV do not perform the steering operation of causing the host vehicle SV to deviate to the outside of the track from any of the "left side deviation regulation line set on the left white line LL and the right side deviation regulation line set on the right white line LR".

For example, in a case where the target object OB is present at the position shown in Case 2 of FIG. 3 (left side region of the travel lane), the lateral margin distance Wy is equal to or smaller than the upper limit value WUth and is equal to or larger than the lower limit value WLth. In this case, most of the drivers of the host vehicle SV pass by the side of the final target object OB while causing the host vehicle SV to deviate from the "track partitioned by the left side deviation regulation line before being moved by the offset distance described below and the right side deviation regulation line before being moved by the offset distance described below". For example, in this case, most of the drivers of the host vehicle SV perform the steering operation of causing the host vehicle SV to deviate to the outside of the track from any of the "left side deviation regulation line set on the left white line LL and the right side deviation regulation line set on the right white line LR".

In a case where the target object OB is present at the position shown in Case 3 of FIG. 3 (substantially central region of the travel lane), the lateral margin distance Wy is smaller than the lower limit value WLth. In this case, the target object is, for example, another vehicle that travels in the same direction as the host vehicle SV (that is, the preceding vehicle), and most of the drivers of the host vehicle SV do not try to pass by the side of the target object. Stated another way, most of the drivers of the host vehicle SV do not perform the steering operation of causing the host vehicle SV to deviate from the "track partitioned by the left side deviation regulation line before being moved by the offset distance described below and the right side deviation regulation line before being moved by the offset distance described below". For example, in this case, most of the drivers of the host vehicle SV do not perform the steering operation of causing the host vehicle SV to deviate to the outside of the track from any of the "left side deviation regulation line set, for example, on the left white line LL and the right side deviation regulation line set, for example, on the right white line LR".

From the above, solely in a case where the deviation passage determination condition is satisfied, a probability that the driver of the host vehicle SV passes by the side of the final target object OB while causing the host vehicle SV to deviate from the "track partitioned by the left side deviation regulation line (before being moved by the offset distance described below) and the right side deviation regulation line (before being moved by the offset distance described below)" is high.

In a case where the deviation passage determination condition is not satisfied, the CPU determines "No" in step S570, proceeds directly to step S595, and temporarily terminates the present routine. On the other hand, in a case where the deviation passage determination condition is satisfied, the CPU determines "Yes" in step S570 and proceeds to step S580. In step S580, the CPU sets the value of the deviation passage determination flag XDP to "1". That is, the CPU determines that a probability that the driver of the host vehicle SV passes by the side of the final target object OB while causing the host vehicle SV to deviate from the track is high. Thereafter, the CPU proceeds to step S595 and temporarily terminates the present routine.

2. Start determination of Track Deviation Prevention Steering Control (Deviation Prevention Steering Control)

Figure 6:
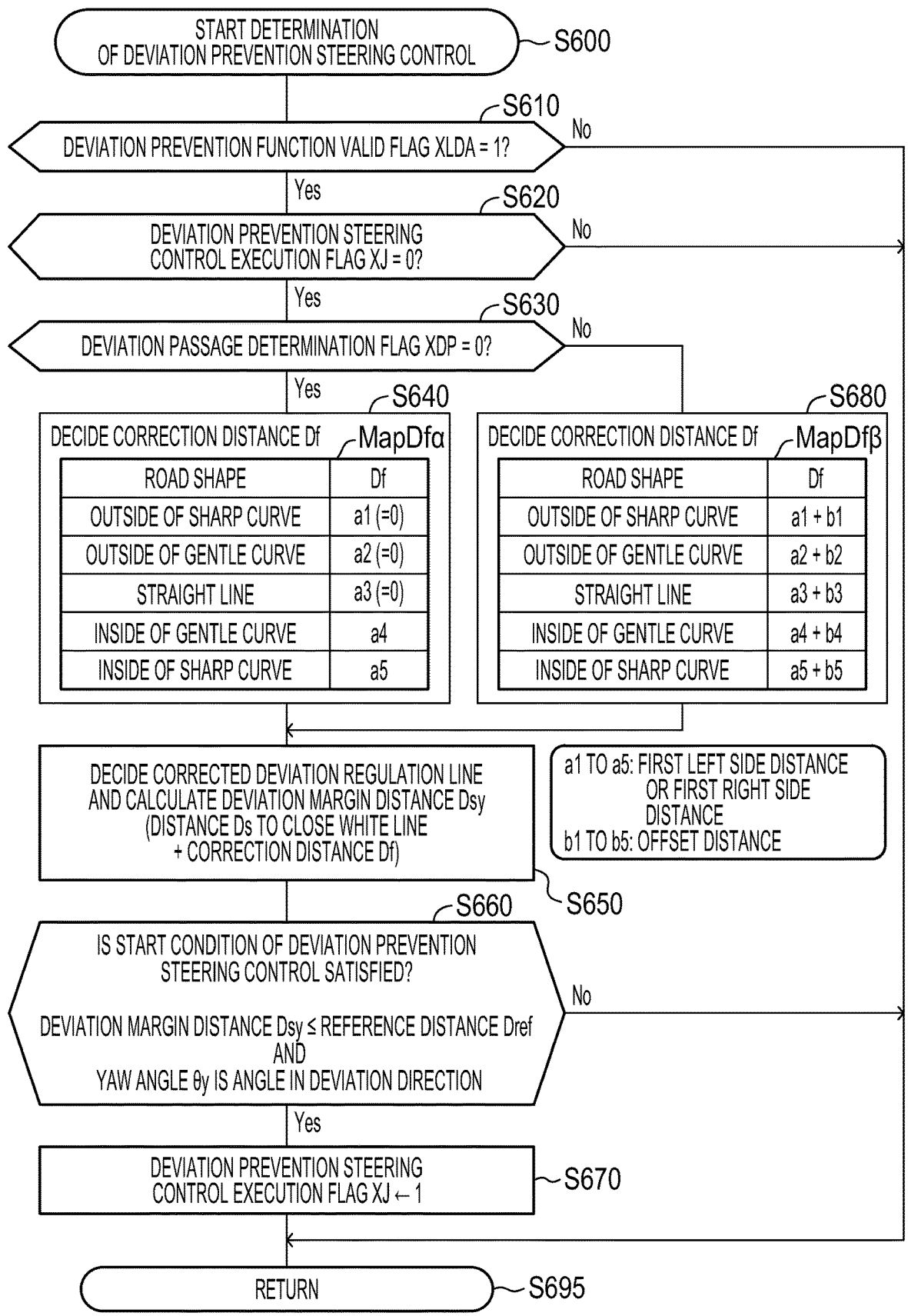
FIG. 6 is a flowchart showing the routine executed by the CPU.
Figure 7:
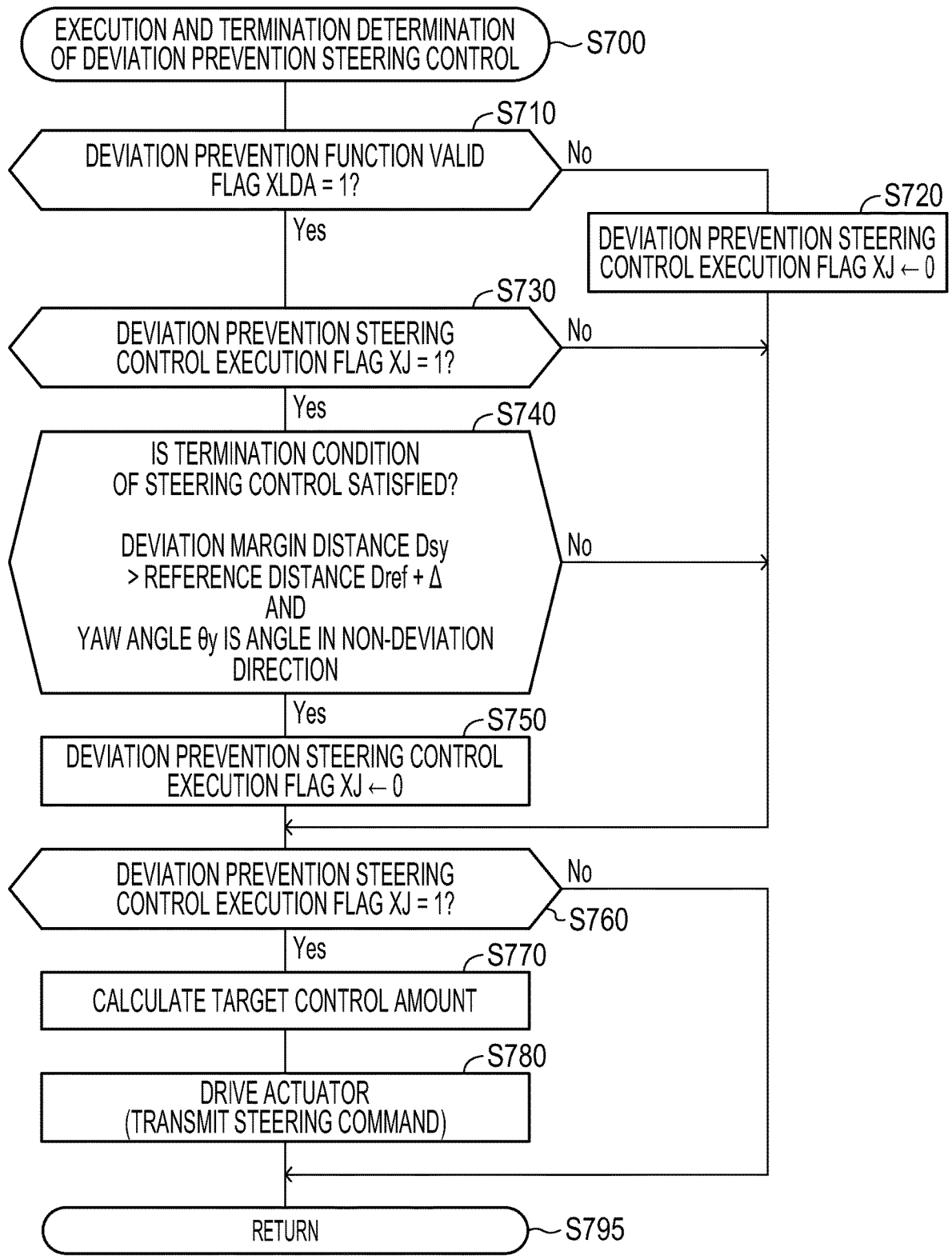
FIG. 7 is a flowchart showing the routine executed by the CPU.

At a predetermined timing, the CPU starts the process from step S600 in FIG. 6 and proceeds to step S610 to determine whether or not a value of a deviation prevention function valid flag XLDA is "1".

In a case where the value of the valid flag XLDA is not "1", the CPU determines "No" in step S610, proceeds directly to step S695, and temporarily terminates the present routine. On the other hand, in a case where the value of the valid flag XLDA is "1", the CPU determines "Yes" in step S610 and proceeds to step S620.

In step S620, the CPU determines whether or not a value of a deviation prevention steering control execution flag XJ is "0". The value of the deviation prevention steering control execution flag XJ is set to "1" while the deviation prevention steering control is being executed (see "step S670, and steps S720 and S750 of FIG. 7" described below).

In a case where the value of the deviation prevention steering control execution flag XJ is not "0" (that is, in a case where the deviation prevention steering control is being executed), the CPU determines "No" in step S620, proceeds directly to step S695, and temporarily terminates the present routine. On the other hand, in a case where the value of the deviation prevention steering control execution flag XJ is "0", the CPU determines "Yes" in step S620 and proceeds to step S630.

In step S630, the CPU determines whether or not the value of the deviation passage determination flag XDP is "0". In a case where the value of the deviation passage determination flag XDP is "0", the CPU determines "Yes" in step S630, proceeds to step S640, and decides a "correction distance Df of the deviation regulation line KL" shown in FIG. 2B and Case 2 of FIG. 4 by using a look-up table MapDf$\alpha$.

More specifically, in the CPU decides whether a road shape is a "sharp curve, a gentle curve, or a straight line" based on the road shape (radius of curvature R or curvature Cv of the lane center line Ld of the travel lane=1/(radius of curvature R)). For example, in a case where the magnitude of the radius of curvature R is smaller than a value R1, the CPU determines that the road shape is the sharp curve. In a case where the magnitude of the radius of curvature R is equal to or larger than the value R1 and is smaller than a value R2, the CPU determines that the road shape is the gentle curve. In a case where the magnitude of the radius of curvature R is equal to or larger than the value R2, the CPU determines that the road shape is the straight line.

Moreover, in a case where the road shape is any of the sharp curve and the gentle curve, the CPU obtains the correction distance Df in accordance with whether the deviation regulation line KL to be corrected is the outside (outer circumference side) of the curve or the inside (inner circumference side) of the curve (see the look-up table MapDf$\alpha$ in step S640). For example, in a case where the host vehicle SV travels on the road with a left curve, a right side of the road is the outside of the curve and a left side of the road is the inside of the curve.

According to the look-up table MapDf$\alpha$, the correction distance Df is obtained as follows.

Correction distance Df outside the curve in a case where the road shape is the sharp curve=a1

Correction distance Df outside the curve in a case where the road shape is the gentle curve=a2

Correction distance Df in a case where the road shape is the straight line=a3 Correction distance Df inside the curve in a case where the road shape is the gentle curve=a4

Correction distance Df inside the curve in a case where the road shape is the sharp curve=a5

According to the look-up table MapDf$\alpha$ shown in the present example, the values a1 to a3 are set to "0", and the values a4 and a5 are set to positive values, respectively. The value a5 is larger than the value a4. These values an (n is an integer from 1 to 5, that is, the values a1, a2, a3, a4, a5) are also referred to as a "first left side distance" in a case where a side to which the value is applied is the left side, and are also referred to as a "first right side distance" in a case where a side to which the value is applied is the right side. The values an (n is an integer from 1 to 5) may include zero and may include a positive or negative value, and the magnitude thereof is, for example, about 1/10 to 1/20 of a travel lane width. It should be noted that the values an (n is an integer from 1 to 5) are generally preferably positive values equal to or larger than zero.

Next, the CPU proceeds to step S650 to decide the left side deviation regulation line based on the left white line LL and the corresponding correction distance Df and to decide the right side deviation regulation line based on the right white line LR and the corresponding correction distance Df. Stated another way, the CPU decides a line obtained by moving the left white line LL to the outside (left side) of the travel lane by the corresponding correction distance Df as a corrected left side deviation regulation line. It should be noted that, in a case where the correction distance Df with respect to the left white line LL is "0", the corrected left side deviation regulation line coincides with the left white line LL. In addition, in a case where the correction distance Df is a negative value, the corrected left side deviation regulation line is a line obtained by moving the left white line LL to a right side by a value |Df|. Further, the CPU decides a line obtained by moving the right white line LR to the outside (right side) of the travel lane by the corresponding correction distance Df as a corrected right side deviation regulation line. In a case where the correction distance Df with respect to the right white line LR is "0", the corrected right side deviation regulation line coincides with the right white line LR. In addition, in a case where the correction distance Df is a negative value, the corrected right side deviation regulation line is a line obtained by moving the right white line LR to a left side by the value |Df|.

Further, the CPU obtains the sum of a distance Ds from the reference point P of the host vehicle SV to the white line of the side to which the host vehicle SV deviates from the "track partitioned by the left side deviation regulation line and the right side deviation regulation line" (hereinafter, referred to as the "deviation side") and the correction distance Df, as "deviation margin distance Dsy (=Ds+Df)". The white line on the deviation side is the white line closer to the reference point P out of the left white line LL and the right white line LR.

For example, in the example shown in FIG. 2A, the sum of the distance Ds between the reference point P and the left white line LL, and the correction distance Df of the left white line LL is obtained as the deviation margin distance Dsy. For example, in the example shown in FIG. 2B, the sum of the distance Ds between the reference point P and the right white line LR, and the correction distance Df of the right white line LR is obtained as the deviation margin distance Dsy.

Next, the CPU proceeds to step S660 of FIG. 6 and determines whether or not the steering control start condition (start condition of track deviation prevention steering control) is satisfied. The steering control start condition is satisfied, for example, in a case where both the following conditions C1 and C2 are satisfied.

Start Condition of Track Deviation Prevention Steering Control (Condition C1) The deviation margin distance Dsy is equal to or smaller than a deviation prevention steering start threshold value Dref that is a positive predetermined value.

(Condition C2) A traveling direction of the host vehicle SV indicated by the yaw angle θy is a direction toward the deviation regulation line on the deviation side.

It should be noted that a deviation prevention steering start threshold value Dref is set to, for example, a value (=(WSV/2)+γ) obtained by adding a predetermined minute positive value γ to a value of ½ of a vehicle width WSV of the host vehicle SV, but is not limited to this.

In a case where the start condition of the deviation prevention steering control is not satisfied, the CPU determines "No" in step S660, proceeds directly to step S695, and temporarily terminates the present routine. On the other hand, in a case where the start condition of the deviation prevention steering control is satisfied, the CPU determines "Yes" in step S660, proceeds to step S670, and sets the value of the deviation prevention steering control execution flag XJ to "1". As a result, the deviation prevention steering control is started as described below (see steps S760 to S780 in FIG. 7).

On the other hand, in a case where the CPU proceeds to step S630, when the value of the deviation passage determination flag XDP is "1" (not "0"), the CPU determines "No" in step S630 and proceeds to step S680. Moreover, in step S680, the CPU uses the look-up table MapDfβ to decide the correction distance Df of the deviation regulation line KL.

More specifically, as described above, the CPU decides whether the road shape is the "sharp curve, the gentle curve, or the straight line". Moreover, in a case where the road shape is any of the sharp curve and the gentle curve, the CPU obtains the correction distance Df in accordance with whether the deviation regulation line KL to be corrected is the outside (outer circumference side) of the curve or the inside (inner circumference side) of the curve (see the look-up table MapDdβ in step S640).

According to the look-up table MapDfβ, the correction distance Df is obtained as follows.

Correction distance Df outside the curve in a case where the road shape is the sharp curve=a1+b1

Correction distance Df outside the curve in a case where the road shape is the gentle curve=a2+b2

Correction distance Df in a case where the road shape is the straight line=a3+b3

Correction distance Df inside the curve in a case where the road shape is the gentle curve=a4+b4

Correction distance Df inside the curve in a case where the road shape is the sharp curve=a5+b5

The values an (n is an integer from 1 to 5) are as described above.

In the present example, the value b1, the value b2, and the value b3 are positive values equal to each other. The value b4 is a positive value smaller than the value b1, and the value b5 is a positive value smaller than the value b4. These values bn (n is an integer from 1 to 5, that is, the values b1, b2, b3, b4, b5) are basically positive values, and in particular, the value b3 is a positive value.

Therefore, the deviation regulation line is moved to further deviation side when viewed from the travel lane (outside of the travel lane) in a case where the value of the deviation passage determination flag XDP is "1" (that is, in a case where a probability that the driver of the host vehicle SV passes by the side of the object OB by causing the host vehicle SV to deviate from the travel lane or the track is high) than a case where the value of the deviation passage determination flag XDP is "0". It should be noted that the value b5 may be "0", and in this case, solely when the road shape is the sharp curve and a deviation direction is the inside of the curve, the deviation regulation line is not moved from the deviation regulation line when the value of the deviation passage determination flag XDP is "0". That is, all of these values bn (n is an integer from 1 to 5, that is, the values b1, b2, b3, b4, b5) need only not be "0". Among these values bn (n is an integer from 1 to 5, that is, the values b1, b2, b3, b4, b5), a value other than "0" is referred to as the "offset distance".

Thereafter, the CPU proceeds to steps S650 and S660, and proceeds to step S670 in a case where a determination is made as "Yes" in step S660. As a result, the deviation margin distance Dsy is a larger value when the host vehicle SV tries to pass by the side of the object and the host vehicle SV deviates from the travel lane in a case where the value of the deviation passage determination flag XDP is "1" than a case where the value of the deviation passage determination flag XDP is "0", so that an execution start timing of the deviation prevention steering control is practically delayed.

3. Execution of Deviation Prevention Steering Control and Termination Determination Thereof At a predetermined timing, the CPU starts the process from step S700 in FIG. 7 and proceeds to step S710 to determine whether or not a value of a deviation prevention function valid flag XLDA is "1".

In a case where the value of the valid flag XLDA is not "1", the CPU determines "No" in step S710 and proceeds to step S720. The CPU sets the value of the deviation prevention steering control execution flag XJ to "0" in step S720, and then proceeds to step S760. On the other hand, in a case where the value of the valid flag XLDA is "1", the CPU determines "Yes" in step S710 and proceeds to step S730.

In step S730, the CPU determines whether or not the value of the deviation prevention steering control execution flag XJ is "1". In a case where the value of the deviation prevention steering control execution flag XJ is not "1", the CPU determines "No" in step S730 and proceeds directly to step S760. On the other hand, in a case where the value of the deviation prevention steering control execution flag XJ is "1", the CPU determines "Yes" in step S730 and proceeds to step S740.

In step S740, the CPU determines whether or not a termination condition of the deviation prevention steering control is satisfied. The termination condition of the deviation prevention steering control is satisfied, for example, in a case where both the following conditions D1 and D2 are satisfied.

Termination Condition of Deviation Prevention Steering Control (Condition D1) The deviation margin distance Dsy is larger than a "value obtained by adding a minute positive value A to the deviation prevention steering start threshold value Dref (=Dref+Δ)". It should be noted that the value A may be "0".

(Condition D2) The traveling direction of the host vehicle SV indicated by the yaw angle θy is not a direction toward the deviation regulation line on the deviation side (is a direction toward the deviation regulation line opposite to the deviation regulation line determined to be the deviation side at the start of the deviation prevention steering control).

In a case where the termination condition of the deviation prevention steering control is not satisfied, the CPU determines "No" in step S740 and proceeds directly to step S760. On the other hand, in a case where the termination condition of the deviation prevention steering control is satisfied, the CPU determines "Yes" in step S740, proceeds to step S750, and sets the value of the deviation prevention steering control execution flag XJ to "0". Thereafter, the CPU proceeds to step S760.

In a case where the CPU proceeds to step S760, the CPU determines whether or not the value of the deviation prevention steering control execution flag XJ is "1". In a case where the value of the deviation prevention steering control execution flag XJ is not "1", the CPU determines "No" in step S760, proceeds directly to step S795, and temporarily terminates the present routine. On the other hand, in a case where the value of the deviation prevention steering control execution flag XJ is "1", the CPU determines "Yes" in step S760, performs the processes of steps S770 and S780 described below in order, proceeds to step S795, and then temporarily terminates the present routine.

Step S770: The CPU obtains a target control amount (target torque Tqtgt in the present example) according to the following expression.

$$Tqtgt = K1 \cdot (Vs^2/R) + K2 \cdot Ds' + K3 \cdot \theta y + K4 \cdot (Yr^* - Yr)$$

In this expression, each of K1, K2, K3, and K4 is a control gain, and the signs thereof (plus and minus) are decided in accordance with whether the travel lane is the right curve, the left curve, or the straight line, whether the deviation regulation line on the deviation side is the left side or the right side, and the like. That is, the sign of the control gain is decided such that the target torque Tqtgt is a "value at which the host vehicle SV travels along the lane center line Ld and toward the lane center line Ld". It should be noted that R is a radius of curvature, Oy is the yaw angle described above, Yr* is a target yaw rate, and Yr is an actual yaw rate of the host vehicle detected by the yaw rate sensor 12b. Ds' is referred to as a side distance and is obtained based on the following expression.

Side distance Ds'=deviation prevention steering start threshold value Dref−deviation margin distance Dsy Therefore, the target torque Tqtgt is calculated such that an absolute value |Tqtgt| is larger as the side distance Ds' is larger. Further, the target torque Tqtgt is calculated such that the absolute value |Tqtgt| of the target torque Tqtgt is larger as the traveling direction of the host vehicle SV indicated by the yaw angle θy is on the deviation side and the magnitude |θy| of the yaw angle θy is larger.

It should be noted that the fourth term (K4·(Yr*−Yr)) on the right side of the above expression may be omitted. Such a method of calculating the target torque Tqtgt itself is well known, and is disclosed in, for example, Japanese Unexamined Patent Application Publication No. 2018-79835 (JP 2018-79835 A) and Japanese Unexamined Patent Application Publication No. 2020-11562 (JP 2020-11562 A).

Step S780: The CPU transmits the steering command including the target torque Tqtgt as the information to the EPS•ECU 20. That is, the CPU drives the steering motor 22 via the EPS•ECU 20, and generates the steering assist torque that coincides with the target torque Tqtgt in the steering motor 22. As a result, the "track deviation prevention steering control" of preventing the host vehicle SV from deviating from the deviation regulation line on the deviation side is executed.

4. Override Determination

Figure 8:
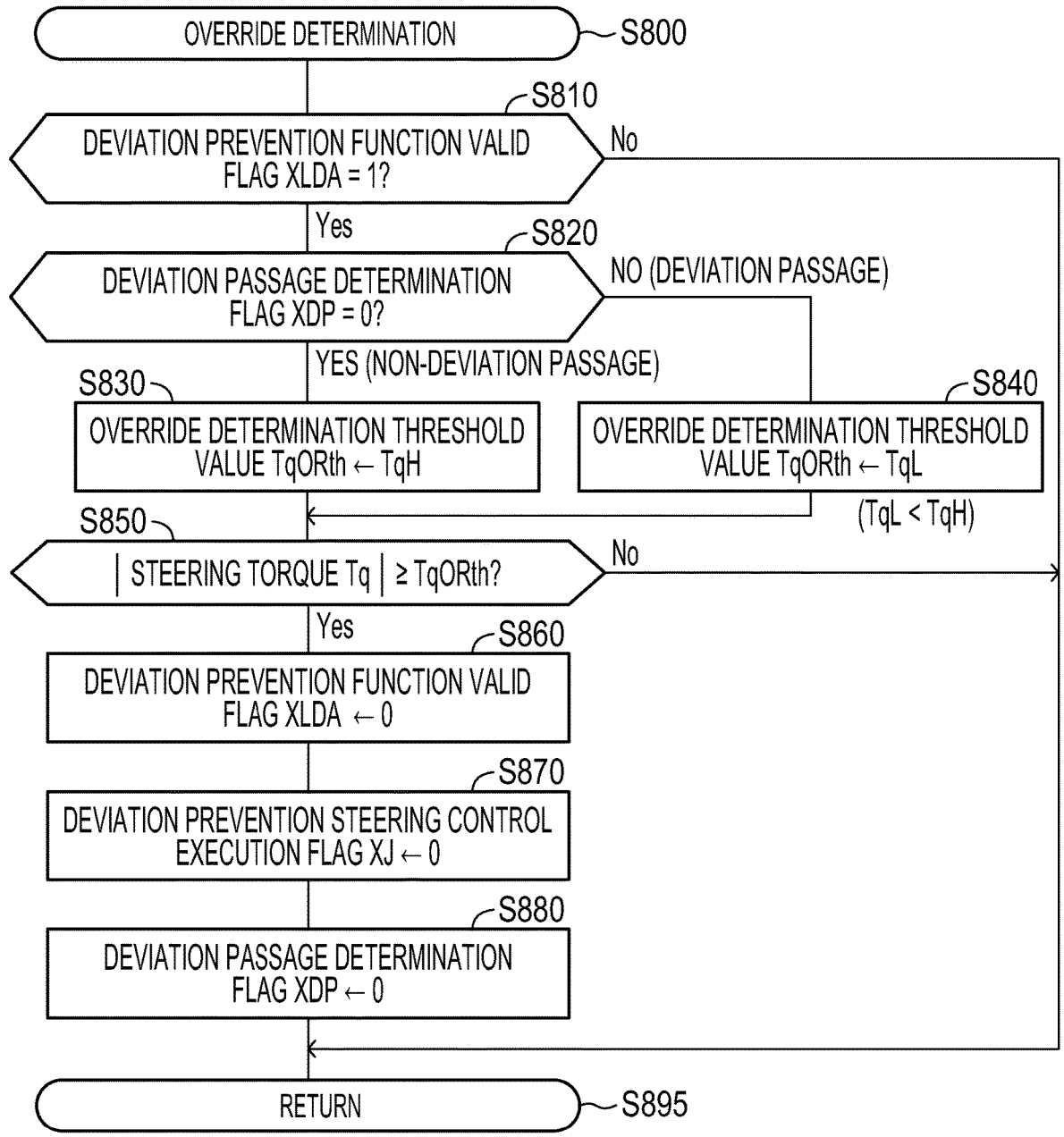
FIG. 8 is a flowchart showing the routine executed by the CPU.
Figure 9:
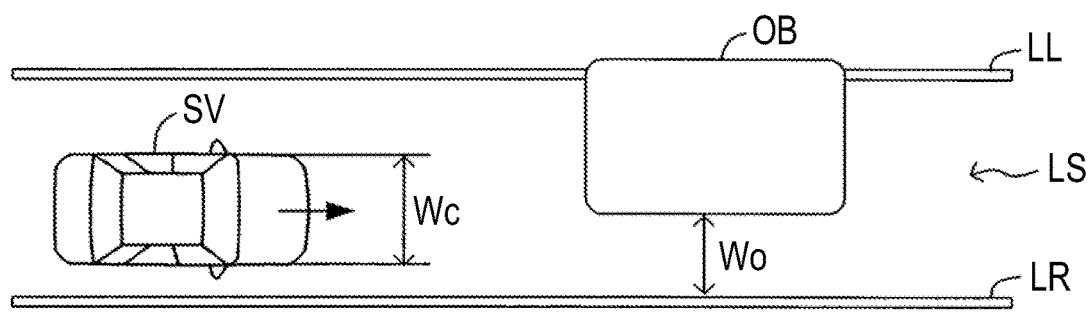
FIG. 9 is a plan view of the travel lane for describing an operation of a related-art device.

At a predetermined timing, the CPU starts the process from step S800 in FIG. 8 and proceeds to step S810 to determine whether or not a value of a deviation prevention function valid flag XLDA is "1".

In a case where the value of the valid flag XLDA is not "1", the CPU determines "No" in step S810, proceeds directly to step S895, and temporarily terminates the present routine. On the other hand, in a case where the value of the valid flag XLDA is "1", the CPU determines "Yes" in step S810 and proceeds to step S820.

In step S820, the CPU determines whether or not the value of the deviation passage determination flag XDP is "0". In a case where the value of the deviation passage determination flag XDP is "0", the CPU determines "Yes" in step S820, proceeds to step S830, and sets the override determination threshold value TqORth to the normal first predetermined value TqH. Thereafter, the CPU proceeds to step S850. It should be noted that the override determination threshold value TqORth is set to the normal first predetermined value TqH in the initialization routine described above.

On the other hand, in a case where the value of the deviation passage determination flag XDP is not "0" (in a case of "1"), the CPU determines "No" in step S820, proceeds to step S840, and sets the override determination threshold value TqORth to the "second threshold value TqL smaller than the first predetermined value TqH". Thereafter, the CPU proceeds to step S850.

In step S850, the CPU determines whether or not the magnitude (|Tq|) of the steering torque Tq is equal to or larger than the override determination threshold value TqORth. In a case where the magnitude (|Tq|) of the steering torque Tq is smaller than the override determination threshold value TqORth, the CPU determines "No" in step S850, proceeds directly to step S895, and temporarily terminates the present routine.

On the other hand, in a case where the magnitude (|Tq|) of the steering torque Tq is equal to or larger than the override determination threshold value TqORth, the CPU determines "Yes" in step S850, performs the processes of steps S860 to S880 described below in order, proceeds to step S895, and then temporarily terminates the present routine.

Step S860: The CPU sets the value of the deviation prevention function valid flag XLDA to "0".

Step S870: The CPU sets the value of the deviation prevention steering control execution flag XJ to "0".

Step S880: The CPU sets the value of the deviation passage determination flag XDP to "0".

As described above, in a case where the value of the deviation passage determination flag XDP is "1" (that is, a probability that the driver of the host vehicle SV passes by the side of the object OB by causing the host vehicle SV to deviate from the travel lane is high), the override determination threshold value TqORth is set to the "second threshold value TqL smaller than the first predetermined value TqH". Therefore, a significant steering operation by the driver is detected in an earlier stage, so that the track deviation prevention function is invalid, and the deviation prevention steering control is stopped (prohibited) in a case where the deviation prevention steering control is executed.

As a result, in a case where a probability that the host vehicle SV deviates from any of the left white line and the right white line when the host vehicle SV passes by the side of the object OB is high, when the driver intentionally performs the steering operation, a probability that the deviation prevention steering control is not executed is high. Therefore, since the steering operation of the driver is more likely to be prioritized, it is possible to reduce the frequency at which the driver feels annoyed with the deviation prevention steering control. It should be noted that the CPU may determine whether or not the value of the deviation prevention steering control execution flag XJ is "1" between steps S810 and S820. In this case, when the value of the deviation prevention steering control execution flag XJ is "1", the CPU proceeds to step S820, and when the value of the deviation prevention steering control execution flag XJ is not "1", the CPU proceeds to step S895. Further, in step S810, the CPU may be configured to determine whether or not the value of the deviation prevention steering control execution flag XJ is "1" instead of determining whether or not the value of the deviation prevention function valid flag XLDA is "1". That is, in at least one case of a case where the track deviation prevention steering control is executed (that is, in a case where the track deviation prevention function is set valid) and a case where the track deviation prevention steering control is executable, the CPU may switch the override determination threshold value TqORth between the "first predetermined value TqH" and the "second threshold value TqL".

The present disclosure is not limited to the embodiment described above, and various modification examples as described below can be adopted within the scope of the present disclosure.

Modification Example 1

For example, the deviation passage determination condition may be a condition that is satisfied in a case where the lateral margin distance Wy is equal to or smaller than the upper limit value (first distance threshold value) WUth (that is, in a case where Wy≤WUth). Further, in this case, in a case where the CPU executes step S540, when the relative speed Vfx of the object in front of the host vehicle SV is within a preceding vehicle relative speed range (−S1 (km/h) to +S1 (km/h)), the object may be excluded from the target object.

Modification Example 2

In a case where the deviation passage determination condition is not satisfied, the CPU of the DSECU may set the line obtained by moving the left side lane marking to a left side by the first left side distance shown in Table 1 decided in accordance with the road shape as the left side deviation regulation line, and may set the line obtained by moving the right side lane marking to a right side by the first right side distance shown in Table 1 decided in accordance with the road shape as the right side deviation regulation line.

Further, in a case where the deviation passage determination condition is satisfied, the CPU of the DSECU may set the line obtained by moving the left side lane marking to a left side by the "sum of the first left side distance and the left side offset distance" shown in Table 1 decided in accordance with the road shape as the left side deviation regulation line, and may set the line obtained by moving the right side lane marking to a right side by the "sum of the first right side distance and the right side offset distance" shown in Table 1 decided in accordance with the road shape as the right side deviation regulation line.

It should be noted that the respective values of the "first left side distance and the first right side distance" shown in Table 1 are "positive or negative values including zero (preferably values equal to or larger than zero)" and the respective values of the "left side offset distance and the right side offset distance" shown in Table 1 are "values larger than zero".

TABLE 1

| Road shape | First left side distance | First right side distance | Left side offset distance | Right side offset distance |
| --- | --- | --- | --- | --- |
| Left sharp curve | D1L1 | D1R1 | OFL1 | OFR1 |
| Left gentle curve | D1L2 | D1R2 | OFL2 | OFR2 |
| Straight line | D1L3 | D1R3 | OFL3 | OFR3 |

TABLE 1-continued

| Road shape | First left side distance | First right side distance | Left side offset distance | Right side offset distance |
|---|---|---|---|---|
| Right gentle curve | D1L4 | D1R4 | OFL4 | OFR4 |
| Right sharp curve | D1L5 | D1R5 | OFL5 | OFR5 |

Modification Example 3

The DSECU may transmit an alarm command to the alarm ECU 30 during the execution of the deviation prevention steering control to notify the driver that the deviation prevention steering control is executed by using the buzzer 31 and/or the display 32.

Modification Example 4

The DSECU may calculate a target rudder angle θtgt instead of the target torque Tqtgt as the target control amount in the deviation prevention steering control to transmit the steering command including this information to the EPS•ECU 20. In this case, the EPS•ECU 20 may drive the steering motor 22 based on target rudder angle θtgt and vehicle speed Vs specified by the steering command to cause an actual rudder angle to coincide with the target rudder angle θtgt.

As described above, the lateral margin distance Wy may be a larger distance out of the distance of the space formed between the object present in front of the host vehicle and the left side lane marking in the track width direction and the distance of the space formed between the object and the right side lane marking in the track width direction, or may be a larger distance out of the distance of the space formed between the object and the left side deviation regulation line (left side deviation regulation line before being moved by the offset distance) in the track width direction and the distance of the space formed between the object and the right side deviation regulation line (right side deviation regulation line before being moved by the offset distance) in the track width direction.

What is claimed is:

1. A track deviation prevention device comprising:
a surrounding sensor configured to acquire surrounding information including information on positions of a left side lane marking and a right side lane marking of a road on which a host vehicle travels, and information on a position of an object positioned in front of the host vehicle;
a rudder angle changing actuator configured to change a rudder angle of the host vehicle; and
a control unit configured to execute track deviation prevention steering control of changing the rudder angle of the host vehicle by controlling the rudder angle changing actuator such that the host vehicle does not deviate from a track, in a state in which the host vehicle travels on the track between a left side deviation regulation line obtained by moving the left side lane marking to a right side or a left side by a first left side distance equal to or larger than zero and a right side deviation regulation line obtained by moving the right side lane marking to a right side or a left side by a first right side distance equal to or larger than zero, in a case where a steering control start condition that is satisfied when a probability that the host vehicle deviates from the track is high is satisfied,
wherein the control unit is configured to
acquire, as a lateral margin distance, a larger distance out of a distance of a space formed between the object and the left side lane marking in a track width direction and a distance of a space formed between the object and the right side lane marking in the track width direction, or a larger distance out of a distance of a space formed between the object and the left side deviation regulation line in the track width direction and a distance of a space formed between the object and the right side deviation regulation line in the track width direction based on the surrounding information in a case where the object is present in front of the host vehicle when the host vehicle travels on the track,
determine whether or not a deviation passage determination condition that is satisfied in a case where a probability that the host vehicle crosses one of the left side deviation regulation line and the right side deviation regulation line to deviate from the track when the host vehicle passes by a side of the object is high is satisfied, based on at least the lateral margin distance,
further move at least a deviation regulation line on a side on which the host vehicle is expected to cross when the host vehicle passes by the side of the object out of the left side deviation regulation line and the right side deviation regulation line to an outside of the track by a predetermined offset distance in a case where a determination is made that the deviation passage determination condition is satisfied,
determine whether or not the lateral margin distance is equal to or smaller than a predetermined first distance threshold value and is equal to or larger than a predetermined second distance threshold value smaller than the first distance threshold value, and determine that the deviation passage determination condition is satisfied at least in a case where a determination is made that the lateral margin distance is equal to or smaller than the first distance threshold value and is equal to or larger than the second distance threshold value,
change the first distance threshold value based on a kind of the object present in front of the host vehicle, and
change the second distance threshold value based on the kind of the object present in front of the host vehicle.

2. A track deviation prevention device comprising:
a surrounding sensor configured to acquire surrounding information including information on positions of a left side lane marking and a right side lane marking of a road on which a host vehicle travels, and information on a position of an object positioned in front of the host vehicle;
a rudder angle changing actuator configured to change a rudder angle of the host vehicle; and
a control unit configured to execute track deviation prevention steering control of changing the rudder angle of the host vehicle by controlling the rudder angle changing actuator such that the host vehicle does not deviate from a track, in a state in which the host vehicle travels on the track between a left side deviation regulation line obtained by moving the left side lane marking to a right side or a left side by a first left side distance equal to or larger than zero and a right side deviation regulation line obtained by moving the right side lane marking to a right side or a left side by a first right side distance equal to or larger than zero, in a case where a steering control start condition that is satisfied when a probability that the host vehicle deviates from the track is high is satisfied, wherein the control unit is configured to
acquire, as a lateral margin distance, a larger distance out of a distance of a space formed between the object and the left side lane marking in a track width direction and a distance of a space formed between the object and the right side lane marking in the track width direction, or a larger distance out of a distance of a space formed between the object and the left side deviation regulation line in the track width direction and a distance of a space formed between the object and the right side deviation regulation line in the track width direction based on the surrounding information in a case where the object is present in front of the host vehicle when the host vehicle travels on the track, determine whether or not a deviation passage determination condition that is satisfied in a case where a probability that the host vehicle crosses one of the left side deviation regulation line and the right side deviation regulation line to deviate from the track when the host vehicle passes by a side of the object is high is satisfied, based on at least the lateral margin distance, further move at least a deviation regulation line on a side on which the host vehicle is expected to cross when the host vehicle passes by the side of the object out of the left side deviation regulation line and the right side deviation regulation line to an outside of the track by a predetermined offset distance in a case where a determination is made that the deviation passage determination condition is satisfied, determine whether or not a magnitude of steering torque applied to a steering wheel of the host vehicle is equal to or larger than an override determination threshold value at least in one case out of a case where the track deviation prevention steering control is executed and a case where the track deviation prevention steering control is executable, and stop the track deviation prevention steering control in a case where a determination is made that the magnitude of the steering torque is equal to or larger than the override determination threshold value, and change the override determination threshold value to a smaller value in a case where a determination is made that the deviation passage determination condition is satisfied than a case where a determination is not made that the deviation passage determination condition is satisfied.

* * * * *